(12) United States Patent
Kato

(10) Patent No.: US 12,142,434 B2
(45) Date of Patent: Nov. 12, 2024

(54) CERAMIC ELECTRONIC DEVICE AND MANUFACTURING METHOD OF THE SAME

(71) Applicant: TAIYO YUDEN CO., LTD., Tokyo (JP)

(72) Inventor: Yoichi Kato, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 17/363,671

(22) Filed: Jun. 30, 2021

(65) Prior Publication Data

US 2022/0084752 A1    Mar. 17, 2022

(30) Foreign Application Priority Data

Sep. 16, 2020   (JP) ................................. 2020-155596

(51) Int. Cl.
*H01G 4/30* (2006.01)
*C04B 35/468* (2006.01)
(Continued)

(52) U.S. Cl.
CPC ........... *H01G 4/30* (2013.01); *C04B 35/4682* (2013.01); *H01G 4/008* (2013.01); *H01G 4/012* (2013.01);
(Continued)

(58) Field of Classification Search
CPC ........... H01G 4/30; H01G 4/005; H01G 4/01; H01G 4/012; H01G 4/2325; H01G 4/1227;
(Continued)

(56) References Cited

U.S. PATENT DOCUMENTS

2006/0250747 A1* 11/2006 Takashima ............... H01G 4/30
361/272
2007/0133147 A1*  6/2007 Ritter ..................... H01G 4/232
361/309
(Continued)

FOREIGN PATENT DOCUMENTS

JP   H06-349669 A   12/1994
JP   H11-340081 A   12/1999
(Continued)

OTHER PUBLICATIONS

Japanese Office Action dated Dec. 5, 2023, in a counterpart Japanese patent application No. 2020-155596. (A machine translation (not reviewed for accuracy) attached.).
(Continued)

*Primary Examiner* — Arun Ramaswamy
(74) *Attorney, Agent, or Firm* — CHEN YOSHIMURA LLP

(57) ABSTRACT

A ceramic electronic device includes a multilayer structure having a parallelepiped shape in which a plurality of dielectric layers and a plurality of internal electrode layers are alternately stacked in a vertical direction, the plurality of internal electrode layers being alternately exposed to two end faces of the parallelepiped shape. A side margin section is a section covering edges of the plurality of internal electrode layers in an extension direction toward two side faces of the parallelepiped shape. The side margin section has a structure in which a plurality of dielectric layers, each containing a ceramic as a main component, and a plurality of conductive layers, each containing a metal as a main component, are alternately stacked in the vertical direction. The plurality of conductive layers are respectively spaced and separated from the plurality of internal electrode layers.

12 Claims, 10 Drawing Sheets

(51) Int. Cl.
  *H01G 4/008* (2006.01)
  *H01G 4/012* (2006.01)
  *H01G 4/12* (2006.01)

(52) U.S. Cl.
  CPC ....... *H01G 4/1218* (2013.01); *C04B 2235/66* (2013.01)

(58) Field of Classification Search
  CPC ... H01G 4/008; H01G 4/1218; C04B 35/4682
  USPC .................. 361/301.4, 303, 321.1, 321.2
  See application file for complete search history.

(56) References Cited

U.S. PATENT DOCUMENTS

| | | | | |
|---|---|---|---|---|
| 2012/0314338 A1* | 12/2012 | Togashi | ............ | H01G 4/232 29/25.03 |
| 2013/0107417 A1* | 5/2013 | Cho | ............ | H01G 4/012 29/25.42 |
| 2015/0114700 A1* | 4/2015 | Park | ............ | H01G 4/012 361/301.4 |
| 2015/0255213 A1* | 9/2015 | Lee | ............ | H01G 4/005 174/258 |
| 2016/0233024 A1* | 8/2016 | Kim | ............ | H01G 4/30 |
| 2017/0243695 A1* | 8/2017 | Kim | ............ | H01G 4/012 |
| 2018/0090273 A1 | 3/2018 | Hwang et al. | | |
| 2019/0096584 A1* | 3/2019 | Hong | ............ | H01G 13/00 |
| 2019/0279820 A1* | 9/2019 | Horn | ............ | D02G 3/44 |
| 2020/0411243 A1* | 12/2020 | Kim | ............ | H01G 4/248 |

FOREIGN PATENT DOCUMENTS

| | | |
|---|---|---|
| JP | 2000-138127 A | 5/2000 |
| JP | 2001-217144 A | 8/2001 |
| JP | 2013-4569 A | 1/2013 |
| JP | 2016-63038 A | 4/2016 |

OTHER PUBLICATIONS

Office Action issued Jun. 12, 2024 in U.S. Appl. No. 18/489,233 which is the child application of the instant application. U.S. Patent Publication No. 1 listed above was cited in that Office Action.

* cited by examiner

FIG. 9A
FIG. 9B
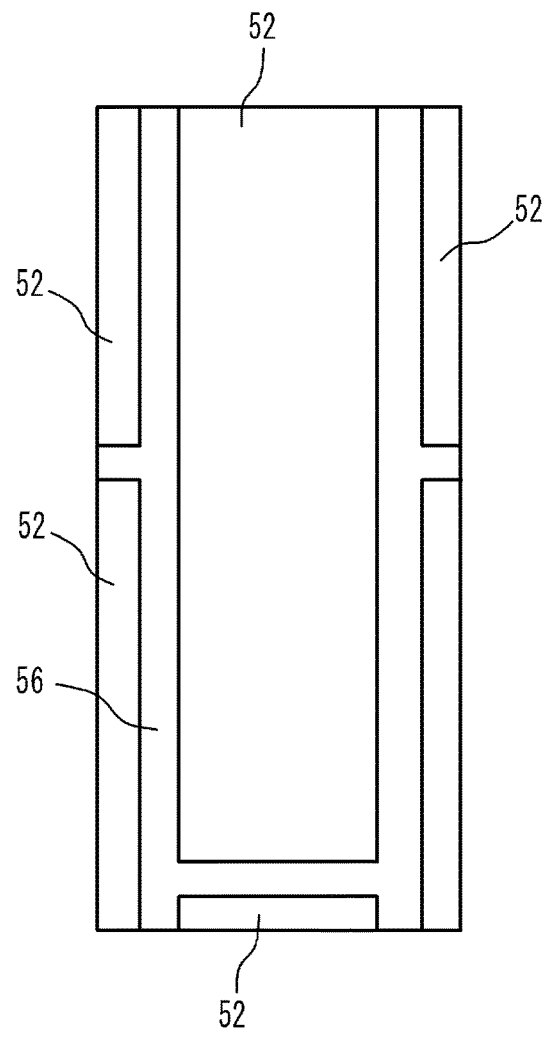
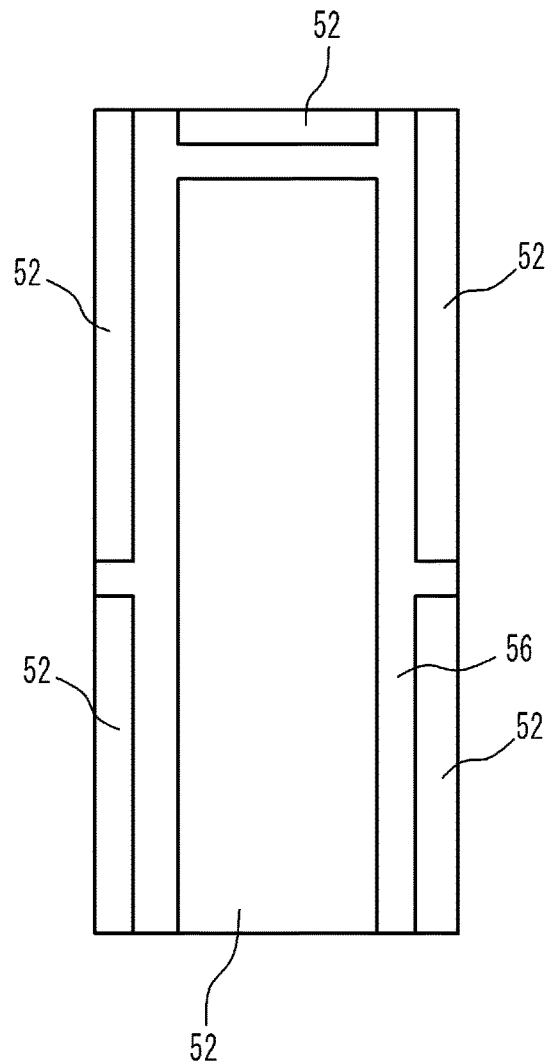

CERAMIC ELECTRONIC DEVICE AND MANUFACTURING METHOD OF THE SAME

FIELD

A certain aspect of the present invention relates to a ceramic electronic device and a manufacturing method of the ceramic electronic device.

BACKGROUND

A ceramic electronic device such as a multilayer ceramic capacitor has a function section in which each of a plurality of internal electrode layers and each of a plurality of ceramic layers are alternately stacked, and margin sections which protects side portions of the internal electrode layers. The side margins is important in a point of securing insulation characteristic or humidity resistance and is made of a ceramic (for example, see Patent Document 1).

RELATED ART DOCUMENTS

Patent Documents

Japanese Patent Application Publication No. H06-349669

SUMMARY OF THE INVENTION

However, when the side margin is made of the ceramic, the strength of the side margin is lower than the strength of the function section having a multilayer structure of a metal and a ceramic. When a breakage occurred in the side margin extends to the function section, the function section is not protected.

The present disclosure has an objective of providing a ceramic electronic component and a manufacturing method of the same that are capable of protecting the function section.

According to an aspect of the present invention, there is provided a ceramic electronic device including; a multilayer structure having a parallelepiped shape in which a plurality of dielectric layers and a plurality of internal electrode layers are alternately stacked in a vertical direction, the plurality of internal electrode layers being alternately exposed to two end faces of the parallelepiped shape, a main component of the plurality of dielectric layers being a ceramic, wherein a side margin section is a section covering edges of the plurality of internal electrode layers in an extension direction toward two side faces of the parallelepiped shape, wherein the side margin section has a structure in which a plurality of dielectric layers, each containing a ceramic as a main component, and a plurality of conductive layers, each containing a metal as a main component, are alternately stacked in the vertical direction, and wherein the plurality of conductive layers are respectively spaced and separated from the plurality of internal electrode layers.

In the above-mentioned ceramic electronic device, the plurality of conductive layers may be respectively located at same heights as the plurality of internal electrode layers. With respect to each of the plurality of internal electrode layers, a cavity may be formed between the internal electrode layer and the corresponding one of the conductive layers that is at the same height as the internal electrode layer.

In the above-mentioned ceramic electronic device, the plurality of conductive layers may be respectively located at same heights as the plurality of internal electrode layers. With respect to each of the plurality of internal electrode layers, an insulation substance may be located between the internal electrode layer and the corresponding one of the conductive layers that is at the same height as the internal electrode layer.

In the above-mentioned ceramic electronic device, the plurality of conductive layers may be respectively located at same heights as the plurality of internal electrode layers. With respect to each of the plurality of internal electrode layers, a distance between the internal electrode layer and the corresponding one of the conductive layers that is at the same height as the internal electrode layer may be 30 µm or less.

In the above-mentioned ceramic electronic device, the plurality of internal electrode layers each contain, as a main component, the same metal as the metal contained in the plurality of conductive layers as the main component.

The above-mentioned ceramic electronic device may include a pair of external electrodes that are respectively provided on the two end faces. The plurality of conductive layers each may have a gap between the pair of external electrodes.

According to another aspect of the present invention, there is provided a manufacturing method of a ceramic electronic device including: preparing a multilayer structure having a parallelepiped shape in which two or more stack units are stacked, the stack units each having a structure in which a metal conductive paste is provided on a green sheet including a main component ceramic; and firing the multilayer structure, wherein the metal conductive paste before the firing has a first gap on a side of a first side face of the multilayer structure and a second gap on a side of a second side face that is opposite to the first side face, the first and second gaps separating and dividing the metal conductive paste into an inner part and outer side parts that are respectively on the sides of the first and second side faces.

In the above-mentioned method, the first gap and the second gap may be formed by removing a part of the metal conductive paste with use of a laser.

With the present disclosure, it is possible to provide a ceramic electronic component and a manufacturing method of the same that are capable of protecting a function section.

BRIEF DESCRIPTION OF THE DRAWINGS

FIG. 9A and FIG. 9B illustrate a stacking process; and

DETAILED DESCRIPTION

A description will be given of an embodiment with reference to the accompanying drawings.

Figure 1:
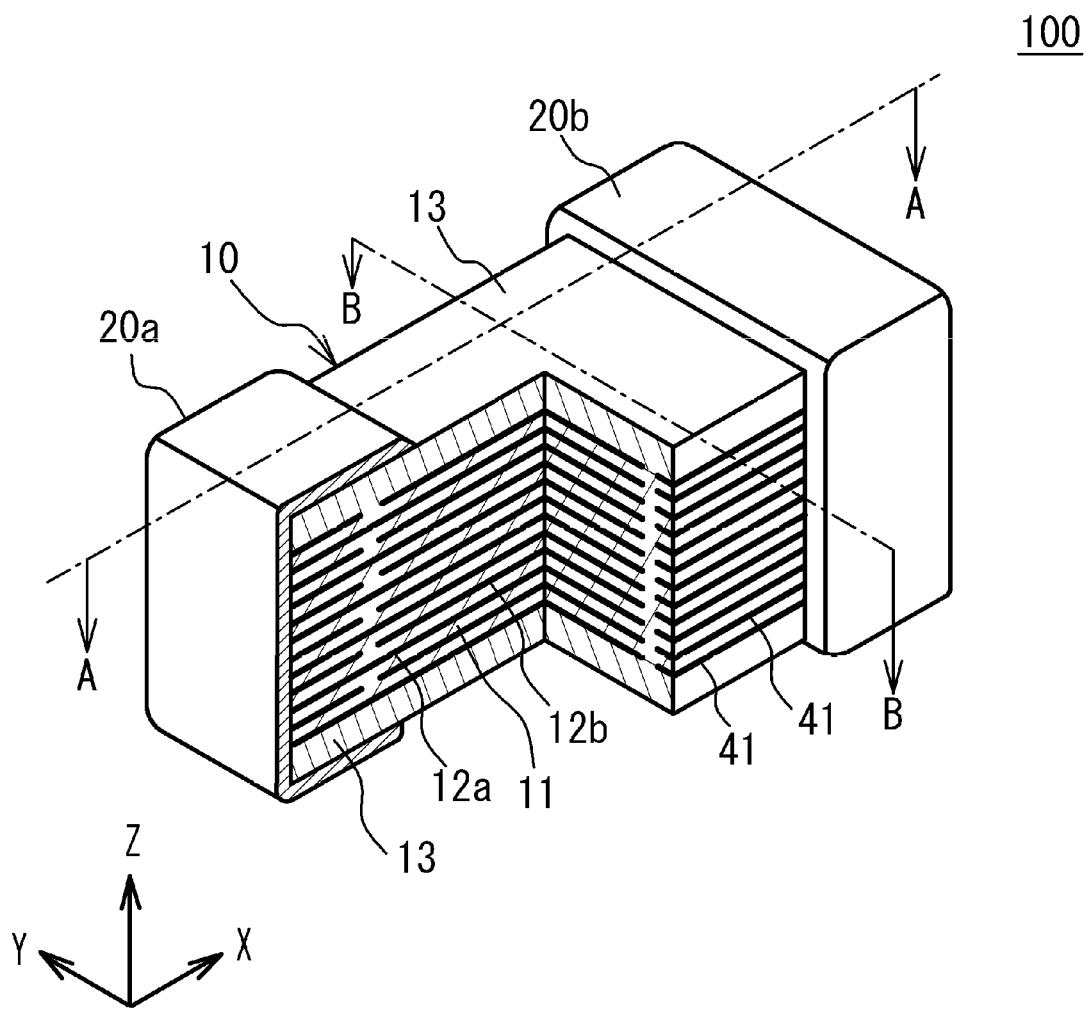
FIG. 1 illustrates a perspective view of a multilayer ceramic capacitor in which a cross section of a part of the multilayer ceramic capacitor is illustrated.
Figure 2A:
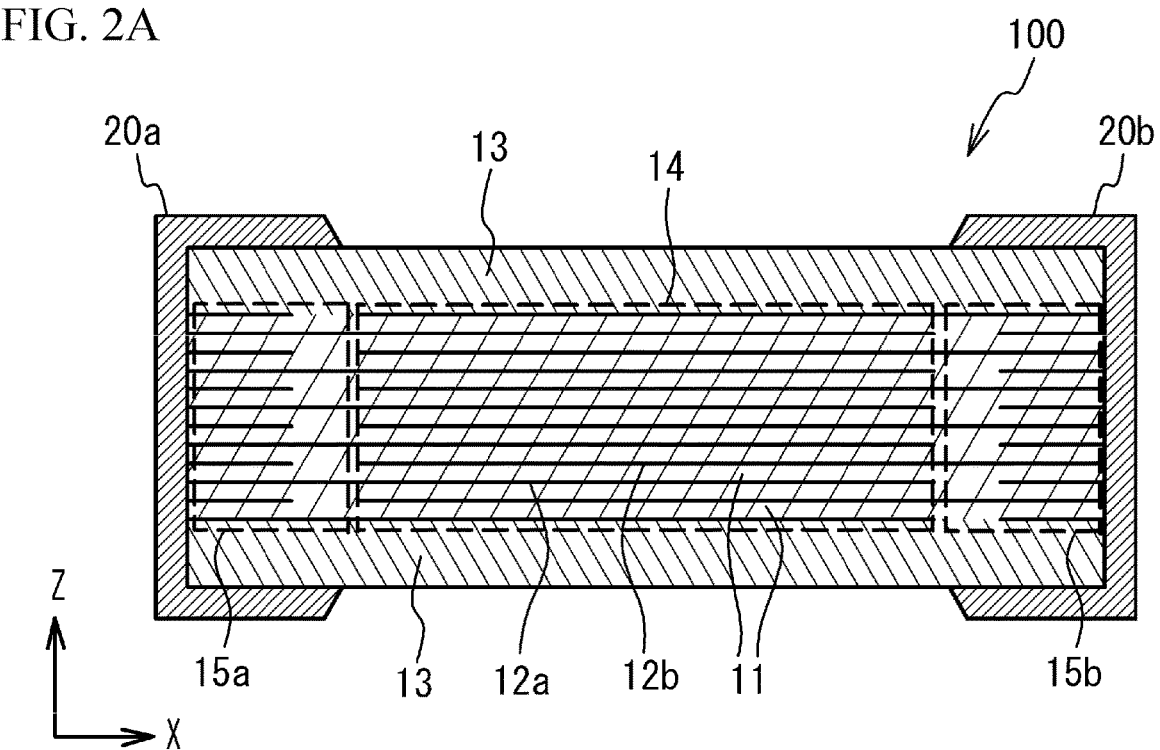
FIG. 2A and FIG. 2B illustrate a cross sectional view taken along a line A-A of FIG. 1.
Figure 2B:
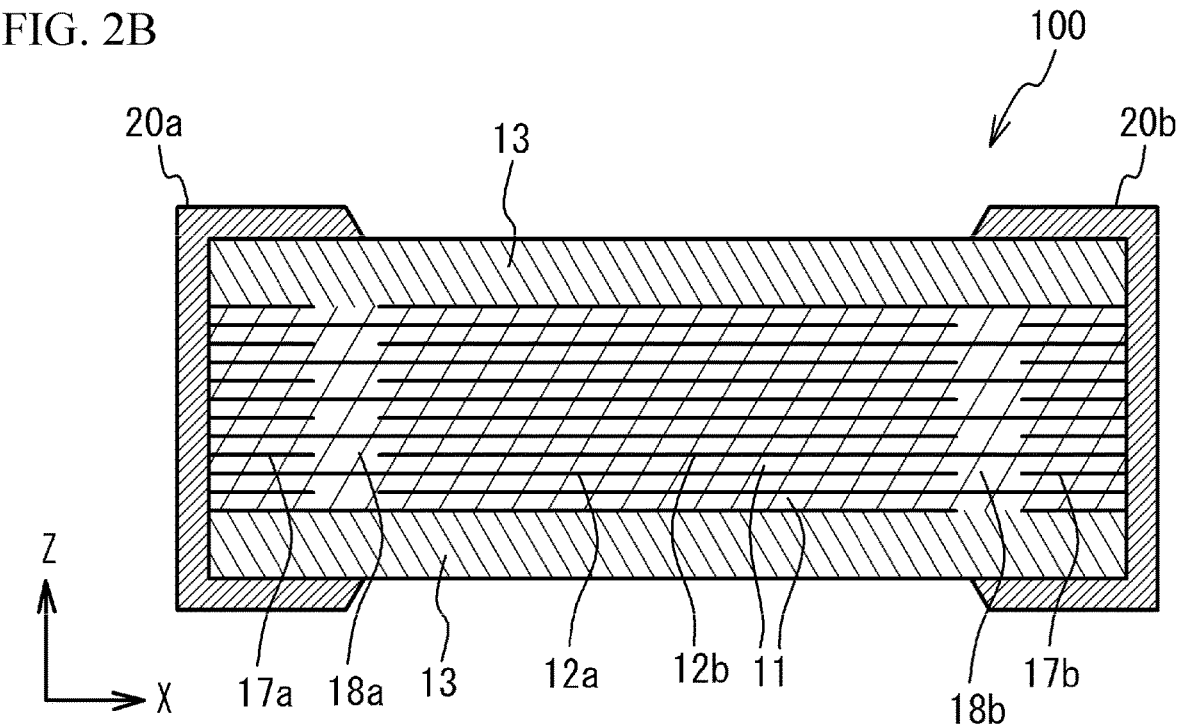
Figure 3:
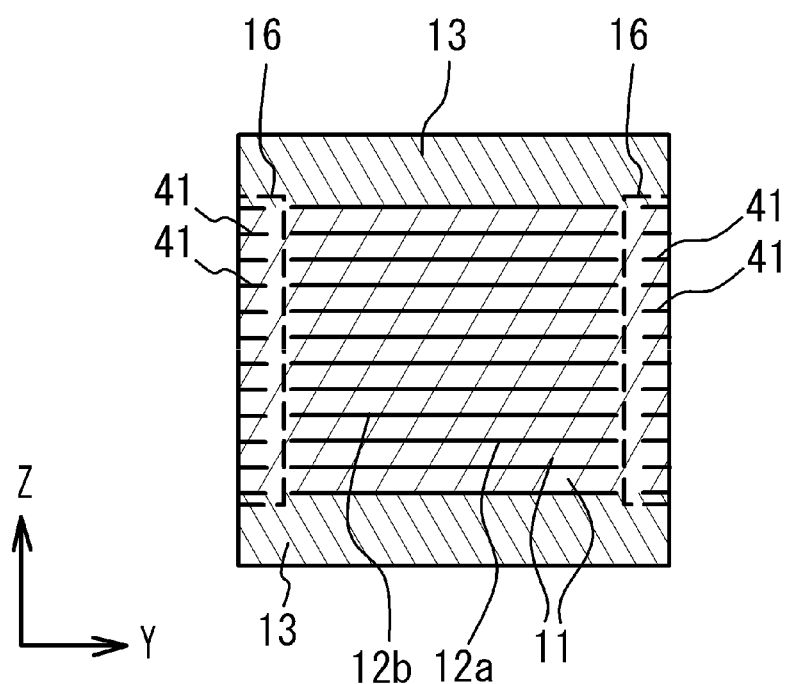
FIG. 3 illustrates a cross sectional view taken along a line B-B of FIG. 1.

(First Embodiment) FIG. 1 illustrates a perspective view of a multilayer ceramic capacitor 100 in accordance with an embodiment, in which a cross section of a part of the multilayer ceramic capacitor 100 is illustrated. FIG. 2A and FIG. 2B illustrate cross sectional views taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other. In FIG. 1, an X-axis direction (first direction) is a length direction of the multilayer chip 10. In the X-axis direction, the two end faces of the multilayer chip 10 are opposite to each other. Moreover, in the X-axis direction, the external electrode 20a is opposite to the external electrode 20b. A Y-axis direction (second direction) is a width direction of the internal electrode layers. A Z-axis direction is the stacking direction. The X-axis direction, the Y-axis direction and the Z-axis direction are vertical to each other.

The multilayer chip 10 has a structure designed to have dielectric layers 11 and internal electrode layers alternately stacked. The dielectric layer 11 includes ceramic material acting as a dielectric material. The internal electrode layers include a base metal material. End edges of the internal electrode layers are alternately exposed to a first end face of the multilayer chip 10 and a second end face of the multilayer chip 10 that is different from the first end face. In the embodiment, the first end face is opposite to the second end face. The external electrode 20a is provided on the first end face. The external electrode 20b is provided on the second end face. Thus, the internal electrode layers are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer. The internal electrode layer connected to the external electrode 20a is referred to as an internal electrode layer 12a. The internal electrode layer connected to the external electrode 20b is referred to as an internal electrode layer 12b. In a multilayer structure of the dielectric layers 11 and the internal electrode layers, the internal electrode layer is positioned at an outermost layer in a stacking direction. The upper face and the lower face of the multilayer structure that are the internal electrode layers are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12a and 12b is a base metal such as nickel (Ni), copper (Cu), tin (Sn) or the like. The internal electrode layers 12a and 12b may be made of a noble metal such as platinum (Pt), palladium (Pd), silver (Ag), gold (Au) or alloy thereof. An average thickness of each of the internal electrode layers 12a and 12b is, for example, 1 μm or less. The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_x Sr_y Ti_{1-z}Zr_zO_3$ ($0 \leq x \leq 1$, $0 \leq y \leq 1$, $0 \leq z \leq 1$) having a perovskite structure. An average thickness of each of the dielectric layers 11 is, for example, 1 μm or less. The number of the stacked internal electrode layers is, for example, 100 to 800.

As illustrated in FIG. 2A, a section, in which a set of the internal electrode layers 12a connected to the external electrode 20a face another set of the internal electrode layers 12b connected to the external electrode 20b, is a section generating electrical capacity in the multilayer ceramic capacitor 100. And so, the section is referred to as a capacity section 14. That is, the capacity section 14 is a section in which the internal electrode layers next to each other being connected to different external electrodes face each other.

A section, in which the internal electrode layers 12a connected to the external electrode 20a face each other without sandwiching the internal electrode layer 12b connected to the external electrode 20b, is referred to as an end margin 15a. A section, in which the internal electrode layers 12b connected to the external electrode 20b face each other without sandwiching the internal electrode layer 12a connected to the external electrode 20a is another end margin 15b. That is, the end margin is a section in which a set of the internal electrode layers connected to one external electrode face each other without sandwiching the internal electrode layer connected to the other external electrode. The end margins 15a and 15b are sections that do not generate electrical capacity in the multilayer ceramic capacitor 100.

Sections such as the capacity section 14 and the end margins 15a and 15b, in which each of dielectric layers and each of internal electrode layers are alternately stacked, may be totally referred to as a function section.

In the end margins 15a and 15b of the multilayer ceramic capacitor 100, steps are formed because internal electrode layers not connected to the external electrode do not exist. Therefore, the multilayer ceramic capacitor 100 has a barrel shape. It is thought that the steps are buried by dielectric layers or dummy electrodes, as a method of burying the steps.

And so, in the embodiment, as illustrated in FIG. 2B, the end margin 15a includes dummy electrode layers 17a (conductive layers), on the side of the external electrode 20a in the same height of the internal electrode layers 12b. The dummy electrode layers 17a are not connected with the internal electrode layer 12b. There is an interval between the dummy electrode layer 17a and the internal electrode layer 12b in the X-axis direction. The interval acts as an insulation gap 18a. The dummy electrode layers 17a may be connected with the external electrode 20a. The dummy electrode layers 17a may not be necessarily connected with the external electrode 20a. It is preferable that a main component metal of the dummy electrode layer 17a is the same as a main component metal of the internal electrode layer 12b. This is because the dummy electrode layer 17a and the internal electrode layer 12b are formed in the same process.

In the end margin 15b, dummy electrode layers 17b (conductive layers) are provided, on the side of the external electrode 20b in the same height as the internal electrode layers 12a. The dummy electrode layers 17b are not connected with the internal electrode layer 12a. There is an interval between the dummy electrode layer 17b and the internal electrode layer 12a in the X-axis direction. The interval acts as an insulation gap 18b. The dummy electrode layers 17b may be connected with the external electrode 20b. The dummy electrode layers 17b may not be necessarily connected with the external electrode 20b. It is preferable that a main component metal of the dummy electrode layer 17b is the same as a main component metal of the internal electrode layer 12a. This is because the dummy electrode layer 17b and the internal electrode layer 12a are formed in the same process.

As illustrated in FIG. 3, a section of the multilayer chip 10 from the two sides thereof to the internal electrode layers 12a and 12b is referred to as a side margin 16. That is, the side margin 16 is a section covering edges of the stacked internal electrode layers 12a and 12b in the extension direction toward the two side faces. The side margin 16 does not generate electrical capacity.

Figure 4A:
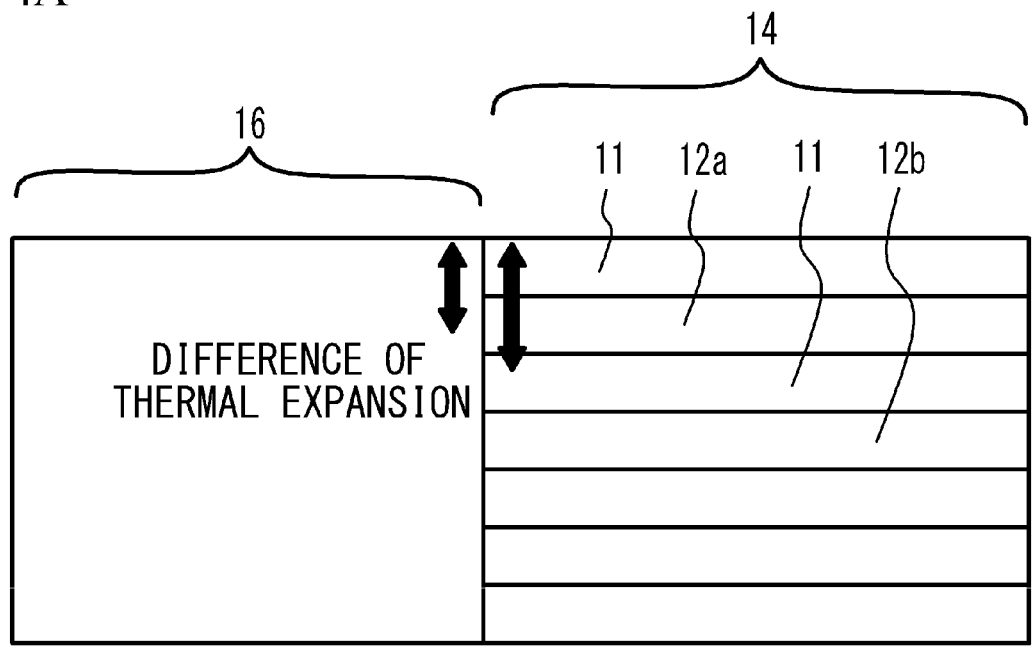
FIG. 4A and FIG. 4B illustrate a side margin.

The side margin 16 acts as an important role in order to secure insulation characteristic, resistance to humidity, and so on. When the side margin 16 is made of only a ceramic, a thermal expansion difference may occur between the side margin 16 and the capacity section 14 made of a ceramic and a metal, as illustrated in FIG. 4A. The thermal expansion difference causes distortion. Therefore, the side margin 16 may not necessarily protect the capacity section 14.

Figure 4B:
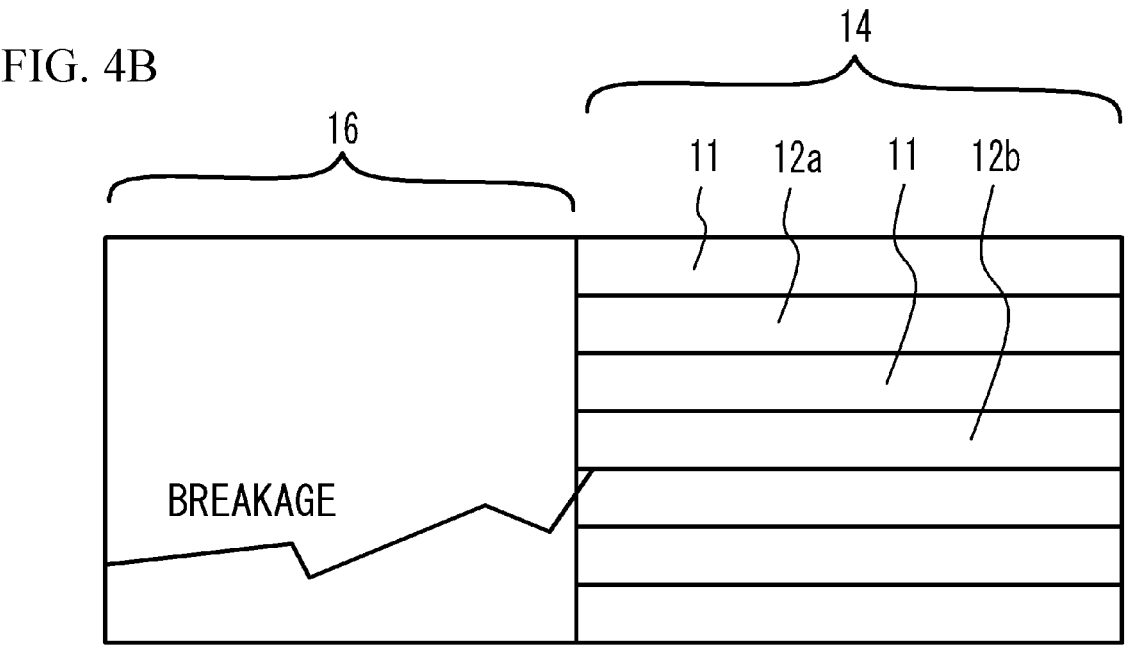

When the side margin 16 is made of only a ceramic, resistance to shock of the side margin 16 may be degraded. Therefore, as illustrated in FIG. 4B, a breakage extending to the capacity section 14 may occur because of outer shock, as illustrated in FIG. 4B. When the breakage occurs, short may occur or reliability may be degraded. Therefore, it is difficult to protect the capacity section 14.

Figure 5:
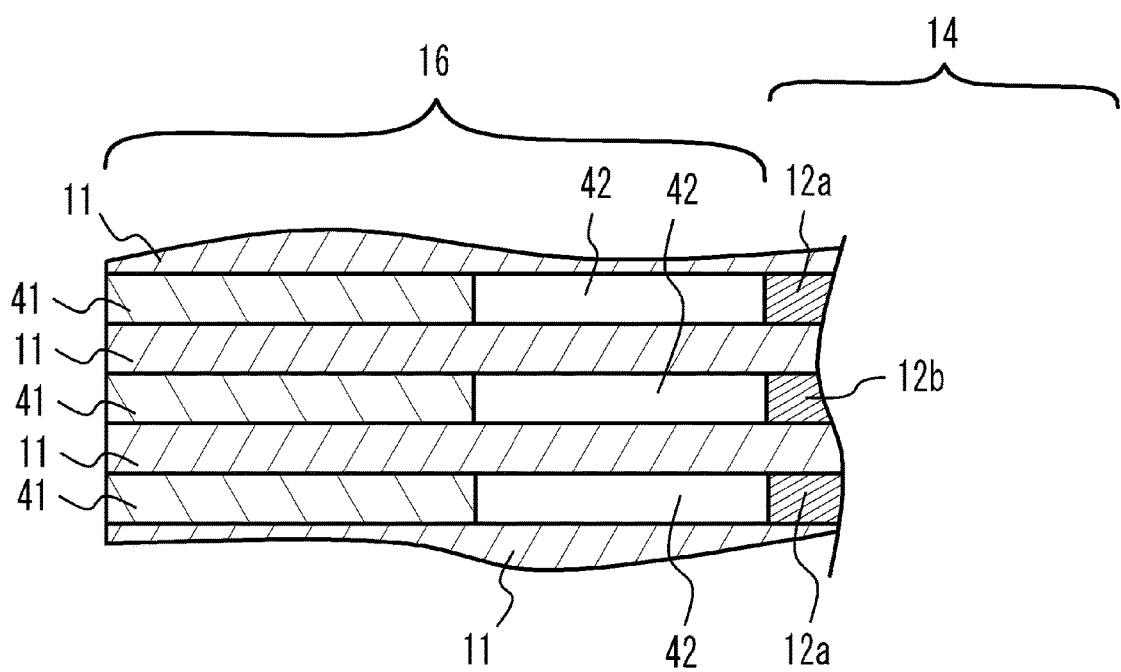
FIG. 5 illustrates a enlarged view of a cross section of a side margin.

And so, the multilayer ceramic capacitor 100 of the embodiment has a structure in which the side margins 16 protect the capacity section 14. FIG. 5 illustrates an enlarged view of the side margin 16 of the embodiment. As illustrated in FIG. 5, the side margin 16 has a structure in which each of a plurality of the dielectric layers 11 and shock absorption layers 41 are alternately stacked in a stacking direction of the dielectric layers 11 and the internal electrode layers 12a and 12b in the capacity section 14. Each of the dielectric layers 11 of the capacity section 14 continuously extend from each of the dielectric layers 11 of the side margin 16. In the side margin 16, the shock absorption layers 41 extend from the side faces of the multilayer chip 10 toward the internal electrode layers 12a and 12b. However, the shock absorption layers 41 are spaced from the internal electrode layers 12a and 12b. Therefore, insulation gaps 42 are formed between the shock absorption layers 41 and the internal electrode layers 12a and 12b. In the embodiment, the insulation gap 42 is a cavity (air gap). Steps formed by the dielectric layers 11 and the internal electrode layers 12a and 12b are buried by the shock absorption layers 41. Therefore, steps between the capacity section 14 and the side margins 16 are suppressed.

The shock absorption layer 41 is a conductive layer of which a main component is a metal. It is preferable that the shock absorption layer 41 is a metal layer. Shock absorption characteristic of a metal is higher than that of a ceramic. Therefore, the shock absorption characteristic of the side margin 16 is improved, compared to a case where the whole of the side margin is made of only a ceramic. And a difference between thermal expansion of the side margin 16 and thermal expansion of the capacity section 14 is small, compared to a case where the whole of the side margin 16 is made of a ceramic. It is therefore possible to protect the capacity section 14.

Figure 6A:
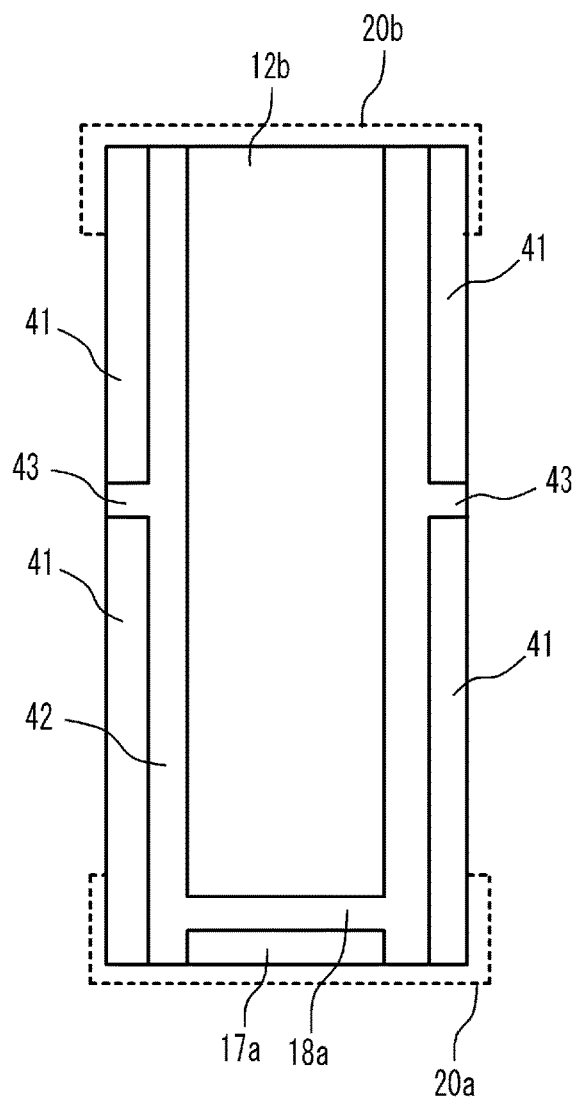
FIG. 6A and FIG. 6B illustrate a plan view of an internal electrode layer and shock absorption layers.
Figure 6B:
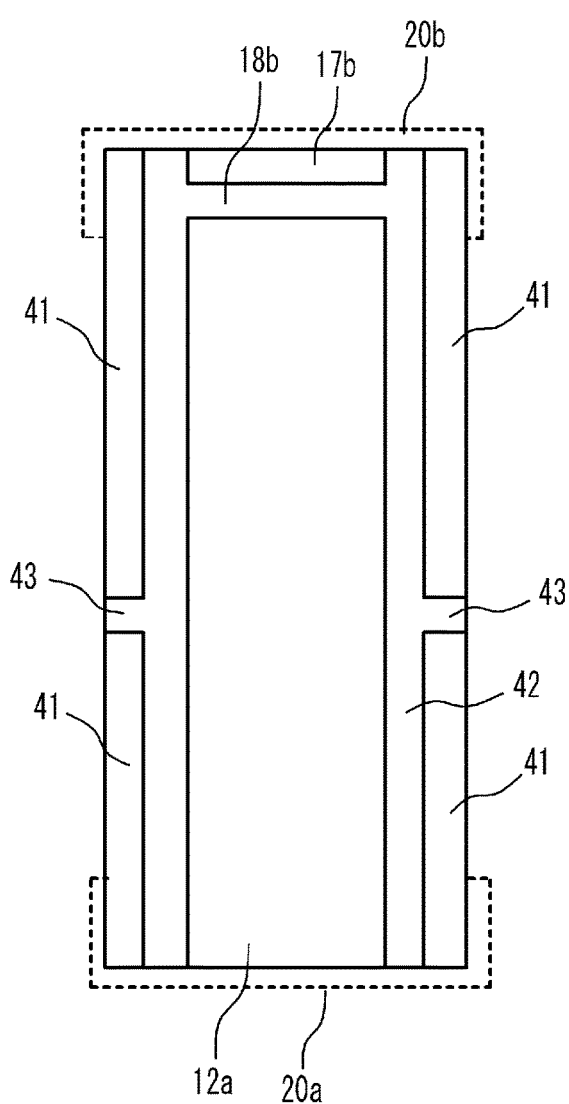
Figure 6B:
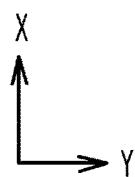

FIG. 6A illustrates a plan view of the internal electrode layer 12b and the shock absorption layers 41. FIG. 6B illustrates a plan view of the internal electrode layer 12a and the shock absorption layers 41. As illustrated in FIG. 6A, the insulation gaps 42 are formed between the internal electrode layer 12b and the shock absorption layers 41. In the shock absorption layer 41, an insulation gap 43 is formed between the external electrode 20a and the external electrode 20b. When the insulation gap 43 is formed, the short between the external electrode 20a and the external electrode 20b is suppressed.

As illustrated in FIG. 6B, the insulation gaps 42 are formed between the internal electrode layer 12a and the shock absorption layers 41. The insulation gap 43 extending along the Y-axis direction is formed between the external electrode 20a and the external electrode 20b, in the shock absorption layer 41. When the insulation gap 43 is formed, short between the external electrode 20a and the external electrode 20b is suppressed. From a viewpoint of suppression of the short, it is preferable that the length of the insulation gap 43 in the X-axis direction is 5 μm or more. It is more preferable that the length is 10 μm or more. It is still more preferable that the length is 15 μm or more. On the other hand, from a viewpoint of improving of shock absorption of the shock absorption layer 41, it is preferable that a length of the insulation gap 43 in the X-axis direction is 100 μm or less. It is more preferable that the length is 50 μm or less. It is still more preferable that the length is 30 μm or less.

When the insulation gap 42 is long in the Y-axis direction, a section of which a material filling density is small is long. In this case, a crack may occur by a thermal shock of a firing process or a reflow process, and insulation characteristic may be degraded. And so, it is preferable that the length of the insulation gap 42 has an upper limit in the Y-axis direction. In the embodiment, it is preferable that the length of the insulation gap 42 in the Y-axis direction is 30 μm or less.

It is preferable that a main component metal of the shock absorption layer 41 is the same as those of the internal electrode layers 12a and 12b. This is because the shock absorption layer 41 and the internal electrode layers 12a and 12b can be formed in a single process.

When a ratio of the length of the shock absorption layer 41 in the Y-axis direction with respect to the thickness of the shock absorption layer 41 in the Z-axis direction is small, the continuity modulus of the shock absorption layer 41 may be degraded because of spheroidizing during the firing process. And so, it is preferable that the length of the shock absorption layer 41 in the Y-axis direction has a lower limit. For example, from a viewpoint of enlarging the length of the shock absorption layer 41 in the Y-axis direction more than the thickness (for example, 0.5 μm to 1 μm) of the shock absorption layer 41 in the Z-axis direction, it is preferable that the length of the shock absorption layer 41 in the Y-axis direction is 1 μm or more. It is more preferable that the length is 3 μm or more. It is still more preferable that the length is 5 μm or more. On the other hand, the shock absorption layer 41 dose not generate electric capacity. It is therefore preferable that the length of the shock absorption layer 41 in the Y-axis direction has an upper limit. It is preferable that the length of the shock absorption layer 41 in the Y-axis direction is 30 μm or less. It is more preferable that the length is 20 μm or less. It is still more preferable that the length is 10 μm or less.

When the side margin 16 is excessively thin in the Y-axis direction, resistance to humidity at a high temperature may be degraded. And so, it is preferable that the thickness of the side margin 16 in the Y-axis direction has a lower limit. For example, it is preferable that the thickness of the side margin 16 in the Y-axis direction is equal to or more than the thickness of one layer of the dielectric layers 11. It is more preferable that the thickness of the side margin 16 in the Y-axis direction is 10 times or more than the thickness of the one layer of the dielectric layers 11. It is more preferable that the thickness of the side margin 16 in the Y-axis direction is 20 times or more than the thickness of the one layer of the dielectric layers 11. When the thickness of the side margin 16 in the Y-axis direction is excessively large, the statistic capacity with respect to a volume unit may be degraded. And so, it is preferable that the thickness of the side margin 16 in the Y-axis direction has an upper limit. For example, it is preferable that the thickness of the side margin 16 in the Y-axis direction is 100 times or less than the thickness of one layer of the dielectric layers 11. It is preferable that the thickness of the side margin 16 in the Y-axis direction is 50 times or less than the thickness of one layer of the dielectric layers 11. It is preferable that the thickness of the side margin 16 in the Y-axis direction is 40 times or less than the thickness of one layer of the dielectric layers 11.

Figure 7:
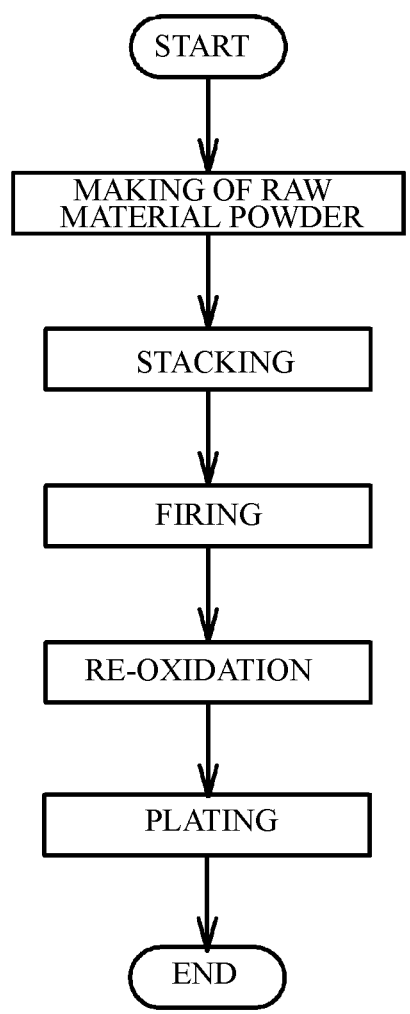
FIG. 7 illustrates a manufacturing method of a multilayer ceramic capacitor.

Next, a description will be given of a manufacturing method of the multilayer ceramic capacitor 100. FIG. 7 illustrates a manufacturing method of the multilayer ceramic capacitor 100.

(Making process of raw material powder) A dielectric material for forming the dielectric layer 11 is prepared. The dielectric material includes the main component ceramic of the dielectric layer 11. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiment may use any of these methods.

An additive compound may be added to resulting ceramic powders, in accordance with purposes. The additive compound may be an oxide of Zr (zirconium), Ca (calcium), Sr (strontium), Mg (magnesium), Mn (manganese), V (vanadium), Cr (chromium) or a rare earth element, or an oxide of Co (cobalt), Ni, Li (lithium), B (boron), Na (sodium), K (potassium) and Si, or glass.

Next, a cover material for forming the cover layer 13 is prepared. The cover material includes the main component ceramic of the cover layer 13. For example, $BaTiO_3$ powder is made as the main component ceramic. It is possible to make the $BaTiO_3$ by the same method as the dielectric material. An additive compound may be added to resulting $BaTiO_3$ powder, in accordance with purposes. The additive compound may be an oxide of Zr, Ca, Sr, Mg, Mn, V, Cr or a rare earth element, or an oxide of Co, Ni, Li, B, Na, K and Si, or glass. The above-mentioned margin material may be used as the cover material.

(Stacking process) Next, a binder such as polyvinyl butyral (PVB) resin, an organic solvent such as ethanol or toluene, and a plasticizer are added to the resulting dielectric material and wet-blended. With use of the resulting slurry, a strip-shaped dielectric green sheet 51 with a thickness of 0.8 μm or less is painted on a base material by, for example, a die coater method or a doctor blade method, and then dried.

Figure 8A:
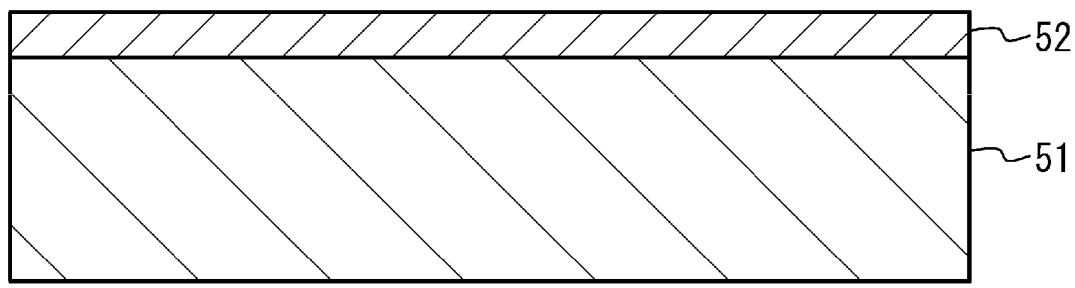
FIG. 8A and FIG. 8B illustrate a stacking process.

Next, as illustrated in FIG. 8A, metal conductive paste for forming an internal electrode is applied to the surface of the dielectric green sheet 51 by screen printing or gravure printing. The metal conductive paste includes an organic binder. Thus, an electrode pattern 52 for forming an internal electrode layer is provided. As co-materials, ceramic particles are added to the metal conductive paste. A main component of the ceramic particles is not limited. However, it is preferable that the main component of the ceramic particles is the same as that of the dielectric layer 11.

Figure 8B:
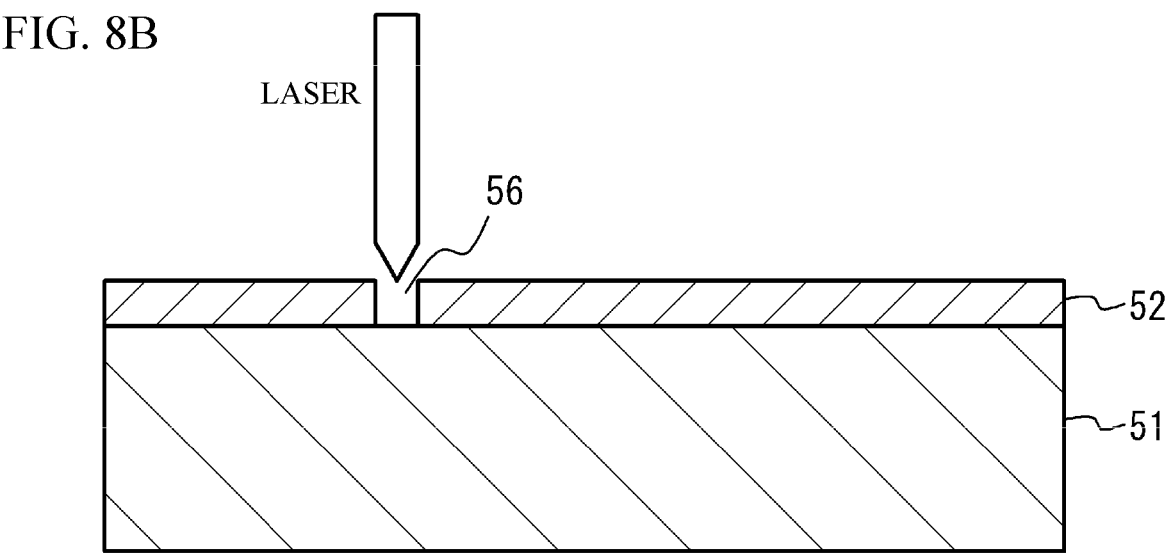

Next, as illustrated in FIG. 8B, a part of the electrode pattern 52 corresponding to the insulation gaps 42 and 43 is removed by a laser. Thus, a groove 56 is formed in the electrode pattern 52. FIG. 9A illustrates an A pattern which is one of two patterns. FIG. 9B illustrates a B pattern which is the other of the two patterns.

A wavelength of a $CO_2$.YAG laser is long. Therefore, a spot diameter of the $CO_2$.YAG laser is large. It is therefore difficult to perform a micromachining. A wavelength of a UV (ultra violet) laser is within an absorption band of the ceramic (for example, barium titanate) of the dielectric green sheet 51. Therefore, the dielectric green sheet 51 may be processed. It is preferable that a visible light laser (blue light to green light) is used. The visible light permeates the dielectric green sheet 51. It is therefore suppress the influence on the dielectric green sheet 51. The wavelength of the visible light is short. Therefore, the spot diameter of the visible light laser is small. And, it is easy to perform the micromachining. Recently, a laser having a picosecond pulse can be used. It is therefore possible to suppress thermal damage on the dielectric green sheet 51. In addition, the diameter of the material included in the metal conductive paste is small. And the thickness of the electrode pattern 52 is reduced. Therefore, it is possible to remove the part of the dielectric green sheet 51 with low energy. Accordingly, the damage on the dielectric green sheet 51 is suppressed. And, on the dielectric green sheet 51, it is possible to directly process the metal conductive paste. Next, each of a plurality of the A patterns and each of a plurality of the B patterns are alternately stacked.

Next, a binder such as polyvinyl butyral (PVB) resin, an organic solvent such as ethanol or toluene, and a plasticizer are added to the cover material made in the raw material making process and wet-blended. With use of the resulting slurry, a strip-shaped cover sheet with a thickness of 10 μm or less is painted on a base material by, for example, a die coater method or a doctor blade method, and then dried. A predetermined number (for example, 2 to 10) of a cover sheet 54 is stacked on an upper face and a lower face of the stacked dielectric green sheets 51 and is thermally clamped.

(Firing process) The binder is removed from the ceramic multilayer structure in $N_2$ atmosphere. Ni paste to be the base layers of the external electrodes 20a and 20b is applied to the ceramic multilayer structure by a dipping method. The resulting ceramic multilayer structure is fired for ten minutes to 2 hours in a reductive atmosphere having an oxygen partial pressure of $10^{-5}$ to $10^{-8}$ atm in a temperature range of 1100 degrees C. to 1300 degrees C. In this manner, it is possible to manufacture the multilayer ceramic capacitor 100.

(Re-oxidizing process) After that, a re-oxidizing process may be performed in $N_2$ gas atmosphere in a temperature range of 600 degrees C. to 1000 degrees C.

(Plating process) After that, by a plating method, metal layers such as Cu, Ni, Sn or the like may be plated on the external electrodes 20*a* and 20*b*.

In the manufacturing method of the embodiment, the electrode pattern 52 has a first gap in the Y-axis direction, on the side of one of the side faces and a second gap in the Y-axis direction, on the side of the other of the side faces. It is therefore possible to form the shock absorption layer 41 and form the insulation gap 42. When the shock absorption layer 41 is formed, the function section can be protected. When the electrode pattern 52 has a gap in the X-axis direction, it is possible to suppress the short between the external electrode 20*a* and the external electrode 20*b*.

Figure 10:
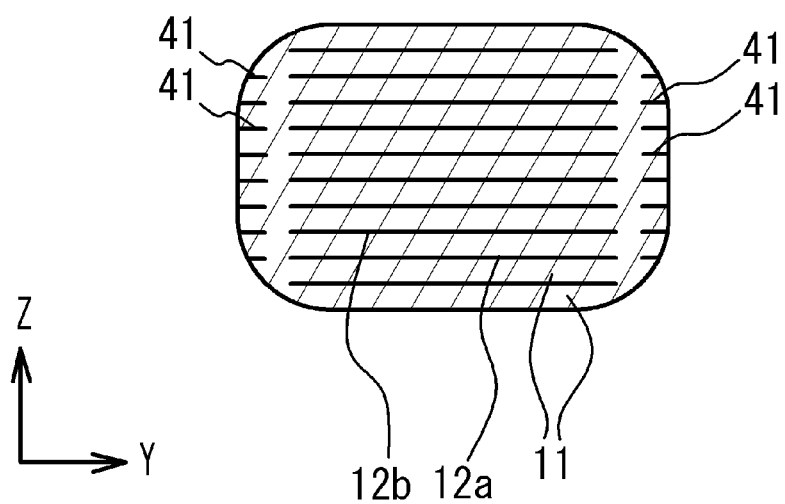
FIG. 10 illustrates a cross sectional view of a multilayer ceramic capacitor of a second embodiment.

(Second embodiment) In the first embodiment, the cover layers 13 are provided. However, the cover layers 13 may not be necessarily provided. FIG. 10 illustrates a cross sectional view of a multilayer ceramic capacitor 100*a* in accordance with a second embodiment. The cross sectional view corresponds to the cross sectional view in the same direction as that of FIG. 3. For example, in the second embodiment, as illustrated in FIG. 10, the cover layers 13 are not provided. And, outermost layers in the stacking direction are two of the dielectric layers 11.

The multilayer ceramic capacitor 100*a* can be manufactured by not forming the cover sheets and not providing the electrode pattern 52 on the uppermost dielectric green sheet 51 in the manufacturing method of the first embodiment. In this case, the thickness of the uppermost dielectric layer 11 and the lowermost dielectric layer 11 is within 95% to 105% of an average thickness of all of the dielectric layers 11.

(Third embodiment) In the first embodiment, the insulation gaps 42 and 43 are cavities. However, an insulation substance may be located in the insulation gaps 42 and 43. For example, a ceramic, a glass, a resin or the like may be located in the insulation gaps 42 and 43. The multilayer ceramic capacitor of the third embodiment can be manufactured by locating the insulation substance in the groove 56 by a printing, in the manufacturing method of the first embodiment.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

The multilayer ceramic capacitors in accordance with the embodiment were made and the property was measured.

(Example 1) An additive was added to barium titanate powder. The additive and the barium titanate powder were sufficiently wet-blended and crushed in a ball mill. Thus, a dielectric material was made. An additive was added to barium titanate powder. The additive and the barium titanate powder were sufficiently wet-blended and crushed in a ball mill. Thus, a cover material was made.

Butyral-based material acting as an organic binder, and toluene and ethanol acting as a solvent were added to the dielectric material. And, the dielectric green sheet 51 was made by a doctor blade method. After that, the electrode pattern 52 of metal conductive paste was printed on the dielectric green sheet 51. Next, a part of the electrode pattern 52 corresponding to the insulation gaps 42 and 43 was removed by a laser or the like. Next, each of the A patterns and each of the B patterns were alternately stacked. The total number of the A patterns and the B patterns was 200.

Next, a binder such as polyvinyl butyral (PVB) resin, an organic solvent such as ethanol or toluene, and a plasticizer were added to the cover material made in the raw material making process and wet-blended. With use of the resulting slurry, the cover sheet was painted on a base and was dried. A predetermined number of the cover sheet was stacked on an upper face and a lower face of the stacked dielectric green sheets 51 and was thermally clamped.

(Example 2) In an example 2, the cover sheet was not stacked. The electrode pattern 52 was not printed on the uppermost dielectric green sheet 51. Other conditions were the same as those of the example 1.

(Comparative example) In a comparative example, a section corresponding to the side margin 16 was made of only a ceramic. Other conditions were the same as those of the example 1.

(Analysis) With respect to each of the examples 1 and 2 and the comparative example, 1000 samples were made. Each sample was subjected to a reflow process. With respect to each of the examples 1 and 2 and the comparative example, a short occurrence rate after the reflow and a fraction defective in a moisture resistant test at a high temperature after the reflow process were measured. It was determined that the short occurred when an insulation resistance was measured and the insulation resistance was 1 MΩ or less. It was determined that the sample was bad in the moisture resistant test at a high temperature, when a voltage of 4 V was applied to a sample under 85° C.-85% RH and was left for 17 hours and the insulation resistance was 1 MΩ or less. Table 1 shows the results.

TABLE 1

|  | SHORT OCCURRENCE RATE AFTER REFLOW | FRACTION DEFECTIVE IN MOISTURE RESISTANT TEST AFTER REFLOW |
| --- | --- | --- |
| EXAMPLE 1 | 0/1000 | 0/1000 |
| EXAMPLE 2 | 0/1000 | 1/1000 |
| COMPARATIVE EXAMPLE | 3/1000 | 5/1000 |

As shown in Table 1, in the comparative example, the short occurrence rate after the reflow was high, and the fraction defective in the moisture resistant was high. It is thought that this was because the side margin was made of only the ceramic, the thermal shock was not absorbed, and the function section was not sufficiently protected. On the other hand, in the examples 1 and 2, the short occurrence rate after the reflow and the fraction defective in the moisture resistant after the reflow were low. It is thought that this was because the side margin had the shock absorption layer 41, the thermal shock was absorbed, and the function section was sufficiently protected. The fraction defective in the moisture resistant after the reflow of the example 1 was smaller than that of the example 2. It is thought that this was because the cover layers 13 were provided, and sufficiently resistance to humidity was achieved.

Although the embodiments of the present invention have been described in detail, it is to be understood that the various change, substitutions, and alterations could be made hereto without departing from the spirit and scope of the invention.

What is claimed is:

1. A ceramic electronic device comprising:
a multilayer structure having a parallelepiped shape in which a plurality of dielectric layers and a plurality of internal electrode layers are alternately stacked in a vertical direction, the plurality of internal electrode layers being alternately exposed to two end faces of the parallelepiped shape, a main component of the plurality of dielectric layers being a ceramic; and
a pair of external electrodes that are respectively provided on the two end faces so as to be respectively connected to the plurality of internal electrode layers that are exposed at the corresponding end faces,
wherein the multilayer structure has a pair of side margin sections, each side margin section being a section covering one of two lateral edges of the plurality of internal electrode layers in an extension direction toward two side faces of the parallelepiped shape,
wherein in a first end margin section that is defined as a section in which the internal electrode layers that are connected to one of the pair of external electrodes face each other in the vertical direction without sandwiching any of the internal electrode layers that are connected to another of the pair of the external electrodes, a plurality of dummy electrode layers connected to said one of the pair of external electrodes and the internal electrode layers connected to said one of the pair of external electrodes are alternately stacked in the vertical direction,
wherein in a second end margin section that is defined as a section in which the internal electrode layers that are connected to said another of the pair of external electrodes face each other in the vertical direction without sandwiching any of the internal electrode layers that are connected to said one of the pair of the external electrodes, a plurality of dummy electrode layers connected to said another of the pair of external electrodes and the internal electrode layers connected to said another of the pair of external electrodes are alternately stacked in the vertical direction,
wherein each of the side margin sections has a structure in which a plurality of dielectric layers, each containing a ceramic as a main component, and a plurality of conductive layers, each containing a metal as a main component, are alternately stacked in the vertical direction,
wherein the plurality of conductive layers in each of the side margin sections are respectively spaced and separated from the plurality of internal electrode layers,
wherein each of the pair of external electrodes extends from the corresponding end face to the two side faces so as to cover a part of the two side faces adjacent to the end face,
wherein each of the conductive layers in each of the side margin sections extends inwardly from the two end faces in inward directions normal to the end faces beyond the parts of the side faces covered by the respective external electrodes, and has a first insulation gap in a middle thereof so as not to short the pair of external electrodes,
wherein the plurality of conductive layers are respectively located at same heights as the plurality of internal electrode layers, and
wherein with respect to each of the plurality of internal electrode layers, a cavity that is an air gap is formed between the internal electrode layer and the corresponding one of the conductive layers that is at the same height as the internal electrode layer.

2. The ceramic electronic device as claimed in claim 1, wherein the plurality of conductive layers are respectively located at same heights as the plurality of internal electrode layers, and
wherein with respect to each of the plurality of internal electrode layers, an insulation substance is located between the internal electrode layer and the corresponding one of the conductive layers that is at the same height as the internal electrode layer.

3. The ceramic electronic device as claimed in claim 1, wherein the plurality of conductive layers are respectively located at same heights as the plurality of internal electrode layers, and
wherein with respect to each of the plurality of internal electrode layers, a distance between the internal electrode layer and the corresponding one of the conductive layers that is at the same height as the internal electrode layer is 30 μm or less.

4. The ceramic electronic device as claimed in claim 1, wherein the plurality of internal electrode layers each contain, as a main component, the same metal as the metal contained in the plurality of conductive layers as the main component.

5. The ceramic electronic device as claimed in claim 1, wherein a distance of the gap is 5 μm or more and 100 μm or less.

6. The ceramic electronic device as claimed in claim 1, wherein a first internal electrode layer of the plurality of internal electrode layers is connected to said one of the pair of external electrodes, and a second internal electrode layer of the plurality of internal electrode layers is connected to said another of the pair of the external electrodes,
wherein the first end margin section includes a first dummy electrode layer of the plurality of dummy electrode layers connected to said one of the pair of the external electrode, the first dummy electrode layer being at the same height as the first internal electrode layer and being separated from the first internal electrode layer by a second insulation gap therebetween,
wherein the first internal electrode layer, the first dummy electrode layer, and the second insulation gap therebetween are arranged side-by-side around a center line between the two side faces of the multilayer structure in a direction in which the pair of external electrodes face each other,
wherein the second end margin section includes a second dummy electrode layer of the plurality of dummy electrode layers connected to said another of the pair of the external electrode, the second dummy electrode layer being at the same height as the second internal electrode layer and being separated from the second internal electrode layer by a third insulation gap, and
wherein the second internal electrode layer, the second dummy electrode layer, and the third insulation gap therebetween are arranged side-by-side around a center line between the two side faces of the multilayer structure in the direction in which the pair of external electrodes face each other.

7. A ceramic electronic device comprising:
a multilayer structure having a parallelepiped shape in which a plurality of dielectric layers and a plurality of internal electrode layers are alternately stacked in a vertical direction, the plurality of internal electrode layers being alternately exposed to two end faces of the parallelepiped shape, a main component of the plurality of dielectric layers being a ceramic; and a pair of external electrodes that are respectively provided on the two end faces so as to be respectively connected to the plurality of internal electrode layers that are exposed at the corresponding end faces, wherein the multilayer structure has a pair of side margin sections, each side margin section being a section covering one of two lateral edges of the plurality of internal electrode layers in an extension direction toward two side faces of the parallelepiped shape, wherein in a first end margin section that is defined as a section in which the internal electrode layers that are connected to one of the pair of external electrodes face each other in the vertical direction without sandwiching any of the internal electrode layers that are connected to another of the pair of the external electrodes, a plurality of dummy electrode layers connected to said one of the pair of external electrodes and the internal electrode layers connected to said one of the pair of external electrodes are alternately stacked in the vertical direction, wherein in a second end margin section that is defined as a section in which the internal electrode layers that are connected to said another of the pair of external electrodes face each other in the vertical direction without sandwiching any of the internal electrode layers that are connected to said one of the pair of the external electrodes, a plurality of dummy electrode layers connected to said another of the pair of external electrodes and the internal electrode layers connected to said another of the pair of external electrodes are alternately stacked in the vertical direction, wherein each of the side margin sections has a structure in which a plurality of dielectric layers, each containing a ceramic as a main component, and a plurality of conductive layers, each containing a metal as a main component, are alternately stacked in the vertical direction, wherein the plurality of conductive layers in each of the side margin sections are respectively spaced and separated from the plurality of internal electrode layers, wherein each of the pair of external electrodes extends from the corresponding end face to the two side faces so as to cover a part of the two side faces adjacent to the end face, wherein each of the conductive layers in each of the side margin sections extends inwardly from the two end faces in inward directions normal to the end faces beyond the parts of the side faces covered by the respective external electrodes, and has a first insulation gap in a middle thereof so as not to short the pair of external electrodes, and wherein an insulator made of a material different from a material of the plurality of dielectric layers is provided in the first insulation gap.

8. The ceramic electronic device as claimed in claim 7, wherein the plurality of conductive layers are respectively located at same heights as the plurality of internal electrode layers, and wherein with respect to each of the plurality of internal electrode layers, an insulation substance is located between the internal electrode layer and the corresponding one of the conductive layers that is at the same height as the internal electrode layer.

9. The ceramic electronic device as claimed in claim 7, wherein the plurality of conductive layers are respectively located at same heights as the plurality of internal electrode layers, and wherein with respect to each of the plurality of internal electrode layers, a distance between the internal electrode layer and the corresponding one of the conductive layers that is at the same height as the internal electrode layer is 30 µm or less.

10. The ceramic electronic device as claimed in claim 7, wherein the plurality of internal electrode layers each contain, as a main component, the same metal as the metal contained in the plurality of conductive layers as the main component.

11. The ceramic electronic device as claimed in claim 7, wherein a distance of the gap is 5 µm or more and 100 µm or less.

12. The ceramic electronic device as claimed in claim 7, wherein a first internal electrode layer of the plurality of internal electrode layers is connected to said one of the pair of external electrodes, and a second internal electrode layer of the plurality of internal electrode layers is connected to said another of the pair of the external electrodes, wherein the first end margin section includes a first dummy electrode layer of the plurality of dummy electrode layers connected to said one of the pair of the external electrode, the first dummy electrode layer being at the same height as the first internal electrode layer and being separated from the first internal electrode layer by a second insulation gap therebetween, wherein the first internal electrode layer, the first dummy electrode layer, and the second insulation gap therebetween are arranged side-by-side around a center line between the two side faces of the multilayer structure in a direction in which the pair of external electrodes face each other, wherein the second end margin section includes a second dummy electrode layer of the plurality of dummy electrode layers connected to said another of the pair of the external electrode, the second dummy electrode layer being at the same height as the second internal electrode layer and being separated from the second internal electrode layer by a third insulation gap, and wherein the second internal electrode layer, the second dummy electrode layer, and the third insulation gap therebetween are arranged side-by-side around a center line between the two side faces of the multilayer structure in the direction in which the pair of external electrodes face each other.

\* \* \* \* \*